(12) United States Patent
Choi

(10) Patent No.: US 6,778,497 B1
(45) Date of Patent: Aug. 17, 2004

(54) DATA COMMUNICATION CONTROL METHOD FOR A NETWORK

(75) Inventor: Woo Young Choi, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/442,746

(22) Filed: Nov. 18, 1999

(30) Foreign Application Priority Data

Dec. 18, 1998 (KR) .......................................... 1998-56120

(51) Int. Cl.⁷ .............................. H04L 1/14; H04L 1/00; H04J 1/16
(52) U.S. Cl. ....................... 370/231; 370/236; 370/253; 714/250
(58) Field of Search .............................. 370/235, 235.1, 370/236, 236.1, 236.2, 230, 232, 252, 253, 410, 445, 448; 714/748, 749, 750

(56) References Cited

U.S. PATENT DOCUMENTS

| | | | | |
|---|---|---|---|---|
| 5,313,455 A | * | 5/1994 | van der Wal et al. | 370/232 |
| 5,426,635 A | * | 6/1995 | Mitra et al. | 370/229 |
| 5,485,147 A | * | 1/1996 | Jaffe et al. | 340/825.5 |
| 6,038,216 A | * | 3/2000 | Packer | 370/231 |
| 6,112,323 A | * | 8/2000 | Meizlik et al. | 714/748 |
| 6,252,851 B1 | * | 6/2001 | Siu et al. | 370/236 |
| 6,404,739 B1 | * | 6/2002 | Gonno | 370/236 |
| 6,473,793 B1 | * | 10/2002 | Dillon et al. | 709/223 |

* cited by examiner

Primary Examiner—Hassan Kizou
Assistant Examiner—Timothy Lee
(74) Attorney, Agent, or Firm—Fleshner & Kim, LLP

(57) ABSTRACT

A data communication method in a network is disclosed. The present invention increases the efficiency of the data communication by preventing a saturation of the network load by receiving only a proper amount of data to be processed and by reducing data communication errors caused by a redundancy of the transmitted addresses.

19 Claims, 2 Drawing Sheets

DATA COMMUNICATION CONTROL METHOD FOR A NETWORK

BACKGROUND OF THE INVENTION

1. Field of the Invention

The present invention relates to a data communication control for a network and more particularly to data communication error prevention in the network.

2. Description of the Related Art

Data communication through a network may be made using a sliding window method. A typical data communication control method using the sliding window method is shown in FIG. 1.

According to the sliding window method, a transmitter first stores a packet data into a queue data memory structure prior to transmitting the packet data to a receiver. The packet data is then transmitted with a sequence number added thereto. Referring to FIG. 1, a receiver determines whether a packet data has been transmitted (step S1), and if the data has been transmitted, the receiver receives the transmitted packet data (step S2).

The receiver next determines whether any errors occurred during the transmission of the packet data. Namely, the receiver determines whether the packet is received with the appropriate sequence number (step S3). This determination is made during the packet reception by determining whether the packet is received in the correct sequence order. If there are no errors in the received packet data, the receiver transmits to the corresponding transmitter a signal acknowledging that the packet has been completely received (step S4). Upon receiving the acknowledgment signal, the transmitter empties the packet data from the queue data memory structure, and enters another packet data to be transmitted into the queue data structure to resume the data transmission.

If the receiver determines that an error has occurred in step S3, the receiver transmits to the transmitter a re-transmission request message requesting a re-transmission of the packet data corresponding to the lost sequence number (step S5). Because the transmitter maintains the queue data structure of the previous packet data until the acknowledgment signal is sent from the receiver, the packet data requested by the receiver can be re-transmitted.

However, data communication for a network using the sliding window method as described above has the following problems. First, if more than one transmitter transmit packets to the same receiver with the same address, the receiver cannot identify the appropriate packets. As a result, the receiver may not receive a packet in the order of its packet sequence number. In such case, a large number of data flow control message generation such as packet re-transmission request messages would be generated between the transmitters thereby creating a peak congestion.

Second, although the hardware of the receiver has a great data processing capacity, the software has a far less of the data processing capacity. Thus, large amounts of transmitted data cannot be processed by the software, thereby interfering with a normal data communication.

SUMMARY OF THE INVENTION

Accordingly, an object of the present invention is to solve at least the problems and disadvantages of the related art.

An object of the present invention is to provide an efficient method for data communication control in a network.

Another object of the present invention is to provide a data communication control method which can prevent a saturation of the network load by receiving only a proper amount of data to be processed.

A further object of the present invention is to provide a data communication control method which can reduce data communication errors due to a redundancy of the transmitted addresses.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the data communication control method for a network includes determining whether a quantity of data transmitted from transmitters exceeds a first reference value; receiving the data if the quantity of the data does not exceed the first reference value; detecting a frequency of flow control message generation between the transmitters after reception of the data, and comparing the detected frequency with a second reference value; and delaying transmission of an acknowledgment signal to the transmitters if the frequency of the flow control message generation exceeds the second reference value as a result of comparison at the third step.

In the present invention, a threshold value of data which a data processing software can perform is determined and the reception of packets exceeding the threshold value is suspended. The present method utilizes a data processing software to receive all receivable packets through a data receiving equipment, while suspending the transfer of the packets exceeding the threshold value from the data receiving equipment to the data processing software.

Also, to cope with the address redundancy from the transmitters, the method according to the present invention detects the frequency of the flow control message generation such as retransmission request messages, transmission fail messages, and re-determination messages generated between the transmitters and a receiver. If the frequency exceeds a predetermined reference value, the method judges the addresses from the different transmitters as redundant, and delays the transmission of the acknowledgment messages to the corresponding transmitters, informing a user of such a situation.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1:
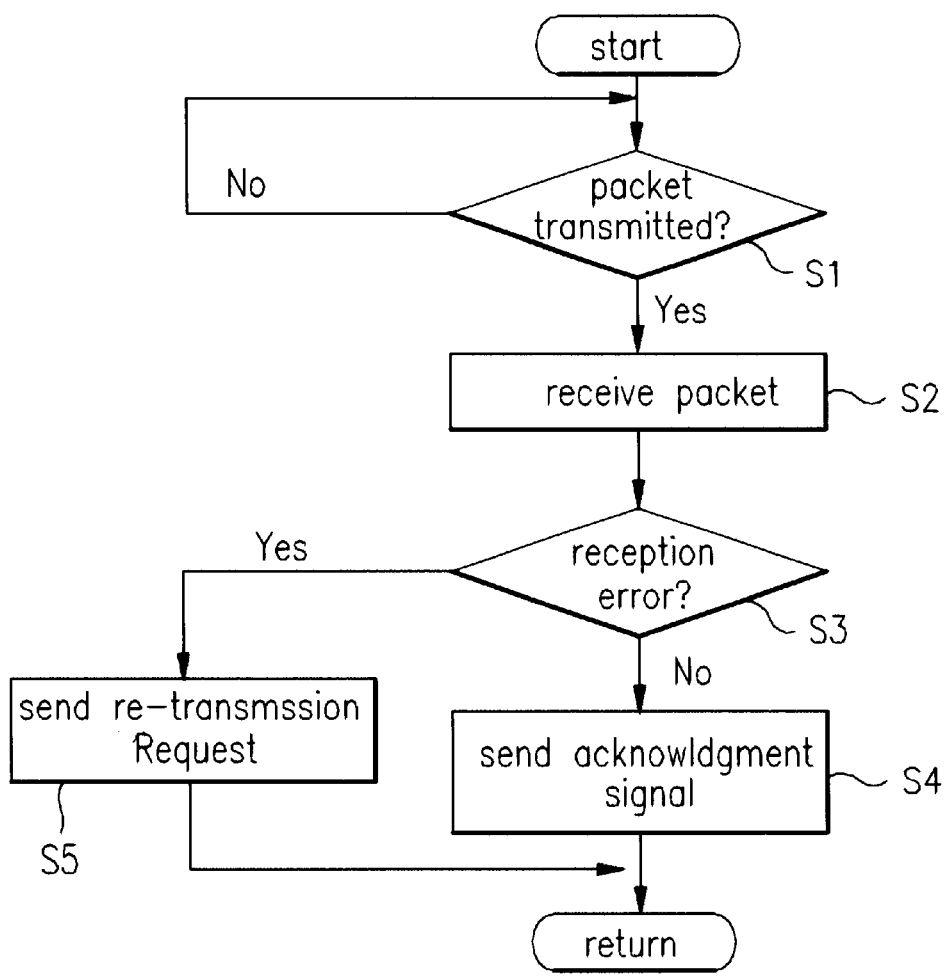
FIG. 1 is a flowchart illustrating a typical data communication control method for a network.
Figure 2:
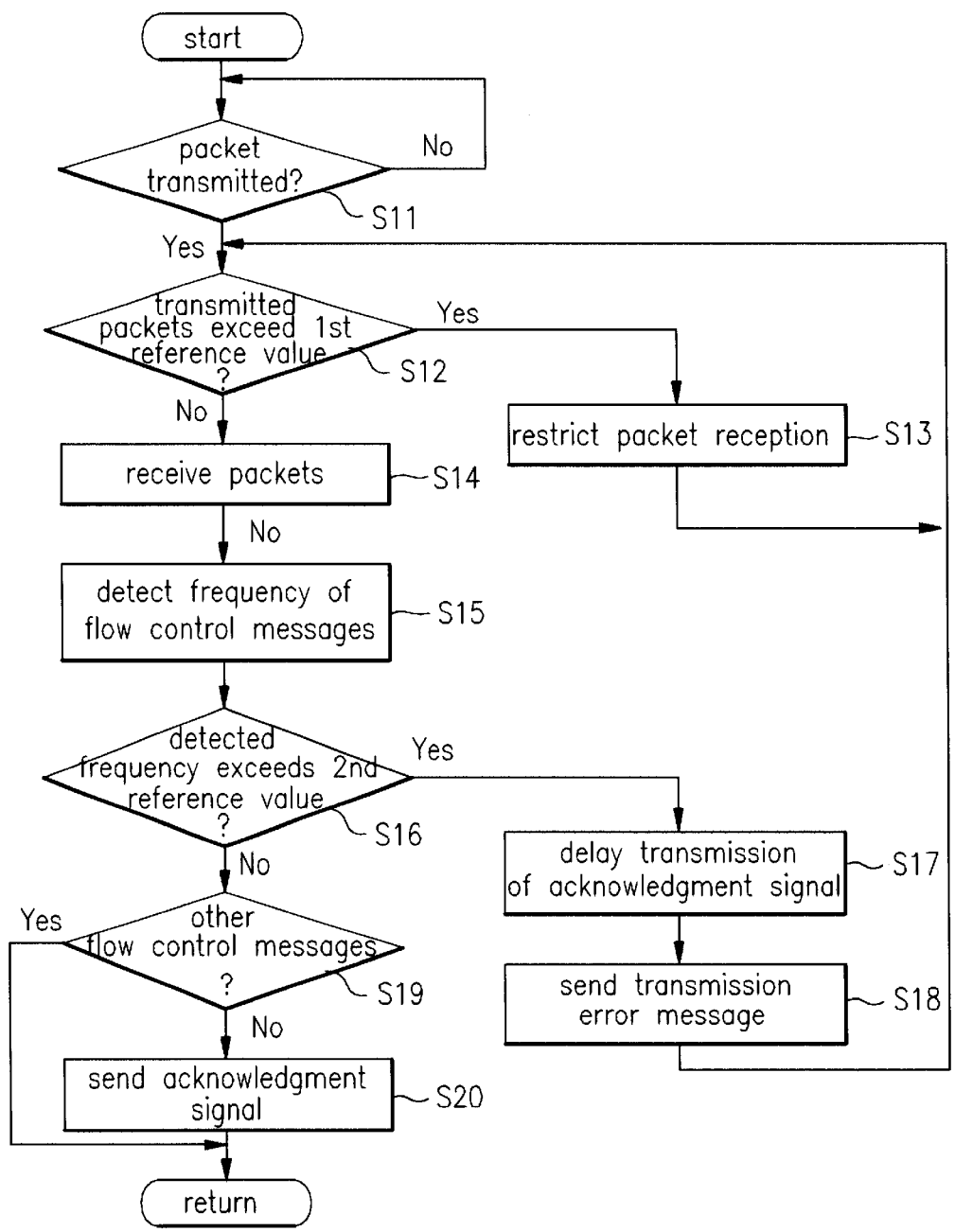
FIG. 2 is a flowchart illustrating the data communication control method for a network according to the present invention.

Reference will now be made in detail to the preferred embodiment of the present invention, examples of which are illustrated in the accompanying drawings. Particularly, FIG. 2 is a flowchart of the data communication control method for a network according to the present invention. Also, as in the sliding window method, a transmitter first stores a packet data into a queue data memory structure prior to transmitting the packet data to a receiver. The packet data is then transmitted with a sequence number added thereto.

Referring to FIG. 2, a receiver first determines whether packets are transmitted from a transmitter (step S11), and if packets are transmitted, determines whether the quantity of the transmitted packets exceeds a threshold value (step S12). The threshold value is determined to be the maximum quantity of packet datas which can be processed by the data processing software of the receiver.

IF the quantity of the transmitted packets exceeds the threshold value in step S12, the receiver restricts further reception of the packets (step S13) and returns to step S12. The restriction prevents a saturation of the load on the network. If the quantity of the transmitted packets does not exceed the threshold value, the receiver continues to receive the corresponding packet (step S14).

Furthermore, to reduce data communication errors due to a redundancy of the transmitted addresses, the receiver detects the frequency of flow control message generation such as packet re-transmission request messages, transmission fail messages, and re-determination messages generated between transmitters and the receiver (step S15). The receiver then determines whether the detected frequency of the flow control message generation exceeds a second predetermined value (step S16). This second predetermined value is determined according to the capacity of the system and the traffic load. Thus, if the detected frequency exceeds the second predetermined value, the receiver judges that two or more transmitters are transmitting packet data to the same address of the same receiver. As a result, the receiver delays the transmission of the acknowledgment message to the corresponding transmitters (step S17), and transmits a transmission address error message to the corresponding transmitters (step S18). The process then returns to step S12.

As discussed above, flow control message generation may be produced due to errors during the data transmission. If the frequency of the flow control message generation exceeds the predetermined value, the receiver may not receive the packets in the order of the packet sequence number due to the fact that two or more transmitters are transmitting packets to the same address of the same receiver. Such a reception error can be prevented by the above-described steps S16~S18.

If the frequency of the flow control message generation does not exceed the predetermined value in step S16, the receiver determines whether any flow control message generation has been produced (step S19). If a flow control message generation has been produced, i.e. if the receiver has transmitted a re-transmission message to the transmitter, the receiver returns to step S11 so that it can receive the packet re-transmitted from the transmitter. If no flow control message generation has been produced in step S19, the receiver judges that the packet transmission has been normally performed, and thus transmits an acknowledgment signal to the corresponding transmitter (step S20) and returns to step S11 for further data communication.

Although the preferred embodiment as described above includes both the prevention of the network load saturation and the reduction of reception errors, steps S12 and S13 may be omitted to simplify the data communication control method. In such case, after the receiver determines that a packet data has been transmitted (step S11), the receiver would receive the packet data (S14) and continue to steps S15~S20. Also, if a transmission error message is sent in step S18, the process would return to step S14.

As described above, the data communication control method for a network according to the present invention can prevent data reception errors by detecting and informing the user the redundancy of an address from the transmitters based upon the frequency of the flow control message generation produced during the data transmission, and by receiving only a proper amount of data to be processed, thereby increasing the system stability and data communication efficiency.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A data communication control method for a network comprising;

(a) transmitting data from at least one transmitter to a receiver;

(b) receiving data from said at least one transmitter;

(c) detecting a frequency of flow control message generation between said at least one transmitter and the receiver, and comparing the detected frequency with a first reference value; and (d) delaying transmission of an acknowledgment signal to said at least one transmitter if the frequency of the flow control message generation exceeds the first reference value, wherein the method further comprises:

determining prior to (b) whether a quantity of data transmitted from said at least one transmitter exceeds a second reference value, and receiving the data if the quantity of data is equal to or does not exceed the second reference value.

2. A method of claim 1, further comprising restricting a reception of the data from said at least one transmitter if the quantity of the data transmitted from said at least one transmitter exceeds the second reference value.

3. A method of claim 1, wherein the second reference value is a maximum quantity of data which can be processed by a receiver.

4. A method of clam 1, further comprising transmitting an acknowledgment signal indicating a complete data reception to said at least one transmitter if the frequency of the flow control message generation is equal to or does not exceed the first reference value.

5. A method of claim 1, wherein (d) further comprises transmitting to said at least one transmitter a transmission error message.

6. A data communication control method for a network comprising:

transmitting data from at least one transmitter to a receiver;

determining whether a quantity of data transmitted from said at least one transmitter exceeds a first reference value;

receiving the data if the quantity of data is equal to or does not exceed the first reference value, and restricting a reception of the data if the quantity of the data exceeds the first reference value;

detecting a frequency of flow control message generation between said at least one transmitter and the receiver, and comparing the detected frequency with a second reference value; and delaying transmission of an acknowledgment signal to said at least one transmitter if the frequency of the flow control message generation exceeds the second reference value.

7. A method of claim 6, wherein the first reference value is a maximum quantity of data which can be processed by a receiver.

8. A method of claim 6, further comprising transmitting an acknowledgment signal indicating a complete data reception to said at least one transmitter if the frequency of the flow control message generation is equal to or does not exceed the second reference value.

9. A method of claim 6, wherein further comprises transmitting to said at least one transmitter a transmission error message if the frequency of the flow control message generation exceeds the second reference value.

10. A data communication control method for a network comprising:

(a) transmitting data from at least one transmitter to a receiver;

(b) determining at the receiver whether a quantity of data transmitted from said at least one transmitter exceeds a first reference value, and receiving the data if the quantity of data is equal to or does not exceed the first reference value;

(c) detecting a frequency of flow control message generation between said at least one transmitter and the receiver, and comparing the detected frequency with a second reference value; and (d) delaying transmission of an acknowledgment signal to said at least one transmitter if the frequency of the flow control message generation exceeds the second reference value.

11. A method of claim 10, wherein the first reference value is a maximum quantity of data which can be processed by a receiver.

12. A method of claim 11, further comprising transmitting an acknowledgment signal indicating a complete data reception to said at least one transmitter if the frequency of the flow control message generation is equal to or does not exceed the second reference value.

13. A method of claim 11, wherein (d) further comprises transmitting to said at least one transmitter a transmission error message.

14. A method of claim 10, further comprising restricting a reception of the data from said at least one transmitter if the quantity of the data transmitted from said at least one transmitter exceeds the first reference value.

15. The method of claim 1, wherein detecting the frequency of flow control message generation is performed at the receiver, and wherein said receiver delays transmission of the acknowledgment message to the at least one transmitter.

16. The method of claim 6, wherein detecting the frequency of flow control message generation is performed at the receiver, and wherein said receiver delays transmission of the acknowledgment message to the at least one transmitter.

17. The method of claim 10, wherein detecting the frequency of flow control message generation is performed at the receiver, and wherein said receiver delays transmission of the acknowledgment message to the at least one transmitter.

18. The method of claim 15, wherein the at least one flow control message is based on an error detectable only by the receiver.

19. The method of claim 18, wherein the error is directly detected.

* * * * *